Jan. 19, 1960 S. GOLDFEIN 2,921,463
CONCRETE STRUCTURAL ELEMENT REINFORCED WITH GLASS FIBERS
Filed Aug. 20, 1952

INVENTOR.
Solomon Goldfein
BY
Bonifant Hamilton
ATTORNEYS

United States Patent Office 2,921,463
Patented Jan. 19, 1960

2,921,463
CONCRETE STRUCTURAL ELEMENT REINFORCED WITH GLASS FIBERS

Solomon Goldfein, Fairfax County, Va., assignor to the United States of America as represented by the Secretary of the Army Application August 20, 1952, Serial No. 305,383

2 Claims. (Cl. 72—50)

(Granted under Title 35, U.S. Code (1952), sec. 266)

The invention described herein may be manufactured and used by or for the United States Government for governmental purposes without the payment of any royalty thereon.

This invention has for its object the production of reinforced concrete structures wherein glass fibers are used as reinforcing elements. Another object of the invention is a new and useful method of producing glass fiber reinforced concrete structures which are prestressed.

Reference is made to the accompanying drawing wherein is illustrated preferred embodiments of my invention which are disclosed.

Figure 1:
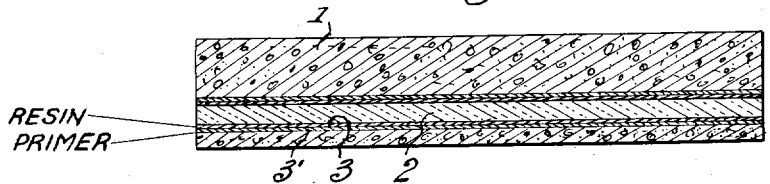
Figure 1 is a cross section of a concrete member reinforced with glass fibers.

Attempts have been made heretofore to produce concrete structural elements reinforced with glass fibers and reference is made to U.S. Patent No. 2,425,883, issued August 19, 1947, to John G. Jackson. However, these attempts have not succeeded. The major difficulty has been the problem of securing adequate bond of the glass fibers to concrete. In the patent referred to above, heat was required to harden a resinous binder embedded in the concrete and glass fibers. Sufficient application of heat to perform this function was costly, slow, and detrimental to the strength of the concrete.

One form of my invention lies in the use of a resin which polymerizes to a hard strong mass without the use of external heat. Resins belonging to the classes of the polyesters, epoxys, resorcinal-formaldehyde, etc., are capable of being polymerized at room temperature in a few minutes or hours with hardeners which are sometimes called catalysts, accelerators, promoters, etc. The glass fibers are first impregnated with a resinous mix. It is then laid in a cementitious base to which has been added sand, gravel, aggregate, and water in proportions well known to those versed in the art of making concrete. When the resin polymerizes, it bonds the glass fibers into a closely woven assembly so that they cannot move relative to each other. Simultaneously it forms a bond to the concrete particles adjacent to the resin. When the concrete mixture sets, a reinforced member is formed in which the reinforcing members (glass fibers) are strongly bonded to the concrete through the medium of the resin-adhesive. The resin-catalyst system and the cement water system are separate systems each of which have their own separate chemical hardening cycles and systems. Examples of a resin-catalyst system will be hereinafter described. Manipulation of the ingredients of the curing system will change the time required for the resin to harden. The speed of this reaction may thus be varied from less than a minute to several days. Likewise, the time of setting of the concrete may be adjusted by the use of steam or such additives as calcium chloride. The liquid resin will bond to both liquid (moldable) and hardened concrete, but liquid concrete will not bond to hardened plastic. Advantage of this fact is taken in the instant construction for reinforced concrete. When the concrete is poured around the resin impregnated glass fibers, or the latter are embedded in moldable poured concrete, the resin and concrete meet at a surface which may be called an interface. At this surface mutual diffusion takes place for a small distance. At a result, a little of the resin enters the cement or concrete area, and some of the cement enters the resinous area. The proportions of the materials which diffuse is a function of their viscosities, mutual solubility, temperature, etc. If the resin and concrete are formulated so that they set simultaneously, an effective strong bond is obtained. This is rarely the case, however. If the resin sets first, it not only bonds the fibers to themselves into a strong bundle, but also bonds the concrete particles which have diffused into it as well. Since the concrete particles which have diffused into it are in contact with other concrete particles adjacent to them and contiguous with the mass of concrete, the effect is the production of a rod covered on the outside with a thin layer of concrete. When the cement in the mass of concrete sets, it will bond to the concrete on the outside of the rod and form an integral bond with it. One of the uses of the cement primer is to cover the less viscous resin and prevent too much penetration of the resin into the concrete. If the cement sets first, the resin will form an excellent bond to the cement.

Variations of this procedure have been found to be effective. For example, a primer 3' has been used to coat the liquid resin surrounding the glass fibers, and has been found useful in preventing the liquid resin from permeating the concrete too far, and ensures a bond between the glass fibers and the concrete. Dry cement powder has been found to be an effective primer.

Another variation of the procedure consists in casting the concrete with holes of the desired diameter in the desired location. Glass fibers impregnated with the resin prepared to self-harden, are then pulled through the holes and left in the desired position to harden and bond to the concrete.

I have found that the structural member comprising the concrete base and bonded glass reinforcing members may be considerably strengthened by prestressing the glass fibers. Since the glass fibers are very brittle and slippery, they are difficult to grasp. It is possible, however, to facilitate the stressing of the fibers by forming at each end of the group of fibers, a "gripping element" which is sufficiently strong to withstand the stress of the tensioning device used in prestressing. Such an element may be formed by a variety of methods. One method which may be used is the formation of a loop at both ends of the fibers as in Figure 4. The fibers may be impregnated with an adhesive of plastic material to render them strong. A hook, mandrel, etc., may be placed through the loop and attached to a tensioning device. Another method which has been found to be satisfactory is the bonding of the fibers at each end directly to a metal strip as in Figure 2 or butt joining a threaded connector to the impregnated fiber glass as in Figures 5 and 6. The metal strip or threaded connector may then be easily attached to a tensioning device as at 8. Breakage of the fibers while under tension may be considerably reduced if the fibers are impregnated with the liquid bonding resin before stressing them. This reduces the friction between parallel fibers rendering them less liable to break or cut each other. The glass fibers impregnated with the self hardening resin are then placed at the desired location in the concrete mix. The glass fibers are then grasped at their ends by the gripping element formed, and stressed by a tensioning device. When the concrete has set, and developed sufficient strength to withstand the prestress which will be placed on it by the glass fibers, the latter are cut loose from the tensioning device, and caused to prestress the structural member.

Post-stressing may be accomplished by first casting the concrete with holes where it is desired to place the glass fiber reinforcing material. Resin impregnated glass fibers prepared for stressing are then drawn through the holes. The fibers are grasped at both ends at the gripping element by a tensioning device, and stretched. When the resin has completely hardened and bonded to the concrete, the tensioning device may be removed, causing the member to become prestressed.

Post-stressed members may be fabricated in which there is no bonding of glass fibers to the concrete. These may be fabricated by allowing the resin in the resin-impregnated glass fibers, to self-harden before they are drawn through the holes in the concrete. The resulting assembly is then stressed.

They may be also fabricated by coating the insides of the holes in the concrete with a mold release agent. The resin impregnated fibers may then be pulled thru the holes and stressed. The mold release agent will prevent a bond from being formed between the concrete and the self-hardening resin during the hardening process. A slip agent such as cellophane may be wrapped around the impregnated glass fibers to prevent the self-hardening resin from bonding them to the concrete.

Figure 2:
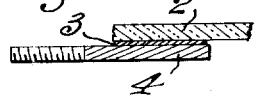
Figure 2 is a cross section of one form of gripping element.
Figure 3:
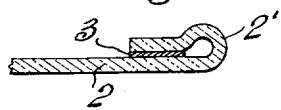
Figure 3 is a cross section of another form of gripping element.
Figure 4:
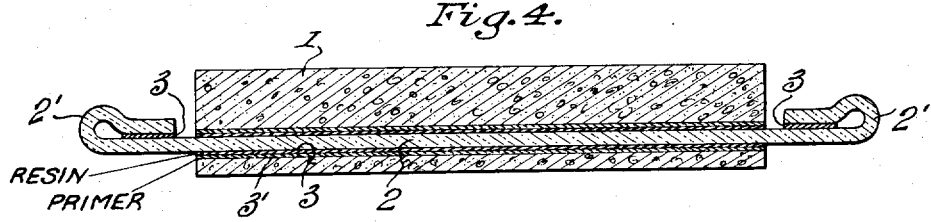
Figure 4 is a cross section of a concrete member reinforced with a fiber glass rod bonded to the concrete and having gripping elements as in Figure 2 for connection to a stress applying device.
Figure 5:
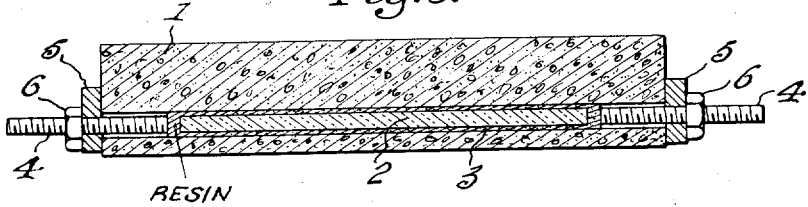
Figure 5 is a cross section of a concrete member which is post-stressed and whose glass fiber reinforcement is bonded to the concrete.
Figure 6:
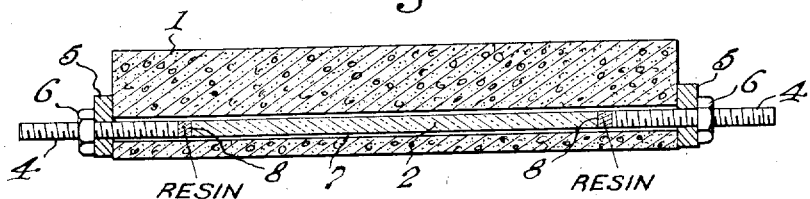
Figure 6 is a cross section of a concrete member which is post-stressed and whose glass fiber reinforcement is not bonded to the concrete.

Referring now to the drawings, Figure 1 discloses a concrete member 1 with the glass fiber reinforcement 2 bonded together and to the concrete by the resin 3. Figure 2 discloses a gripping element comprising glass fibers 2 bonded together and to a metallic connector 4 by the resin or adhesive 3. Figure 3 discloses a gripping element comprising glass fibers 2 bonded together by a resin or adhesive 3 so as to form a loop 2'. Figure 4 discloses a concrete member which has been prestressed by the assistance of the gripping element shown in Figure 3. The concrete 1 is reinforced with glass fibers 2 bonded together and to the concrete by a resin 5 which also serves to bond the gripping element together. Figure 5 discloses a concrete member which has been post-stressed by the assistance of a gripping element which is a threaded metallic connector butt joined to the bonded fiber glass reinforcement. The concrete 1 is reinforced with glass fibers 2 bonded together by a resin 3. The threaded metallic connector 4 is butt joined to glass fibers 2 by a resin or adhesive 3. A nut 6 transfers the stress to the concrete through the plate 5. Figure 6 discloses a concrete member which has been post-stressed with the assistance of a gripping element similar to that in Figure 5, butt joined to the impregnated fiber glass reinforcement. The concrete member 1 is reinforced with glass fibers 2 bonded together by the resin 3. There is no adhesion of the glass fibers to the hole 7 in the concrete. The metallic connector 4 is bonded to glass fibers 2 by a resin or adhesive 3. A nut 6 transfers the stress to the concrete through the plate 5.

The term "glass fibers" is construed to mean any fibers which are formed by melting and drawing out into small fibers such materials as glass, quartz, or other closely related silicate type materials.

The term cement is construed to include Portland cement which is usually made by burning a mixture of calcareous and argillaceous materials, and magnesite, Lumnite refractory, and other cements, which are essentially mixtures of silicates, magnesium, and aluminum, etc. compounds.

The term concrete is construed to mean a mixture of cement, sand, gravel and water which sets to a strong hard mass.

The term self-hardening resin is construed to mean any resin which may be hardened or polymerized to a strong infusible mass by the addition of one or more addition agents without the use of external heat. An example of such a resin is a polyester unsaturated alkyd and a cross-linking monomer catalyzed with methyl ethyl ketone peroxide using cobalt naphthenate as an accelerator.

The term adhesive is construed to mean either a self hardening resin as described above, or any adhesive which sets to a hard infusible mass.

The term primer is construed to mean any material which will effect a good bond between concrete and a group of glass fibers consolidated by means of a self-hardening resin. An example of a primer is cement powder.

While I have illustrated and described several forms of my invention now preferred by me, I do not wish to be restricted thereto but desire that all equivalents covered by the appended claims shall be included therein.

I claim as my invention:

1. A reinforced structural member comprising a concrete mass and a fiber glass reinforcing rod positioned within said concrete mass; said fiber glass reinforcing rod having a plurality of glass fibers, a self-hardening resin impregnating and binding said glass fibers into a consolidated mass and coating the surface of said fiber glass reinforcing rod, and a water settable powdered Portland cement primer covering the self-hardening resin coating and forming a bonding layer between said consolidated mass of glass fibers and said concrete mass, said water settable powdered primer combining with water from said concrete mass to set and bond said consolidated mass of glass fibers and said concrete mass.

2. A reinforced structural member as recited in claim 1 wherein said plurality of glass fibers in said reinforcing rod are under tension and said concrete mass bonded to said consolidated mass of glass fibers is under compression.

References Cited in the file of this patent

UNITED STATES PATENTS

| 1,781,699 | Parmley | Nov. 18, 1930 |
|---|---|---|
| 2,319,105 | Billner | May 11, 1943 |
| 2,354,110 | Ford et al. | July 18, 1944 |
| 2,372,048 | Auxier | Mar. 20, 1945 |
| 2,413,990 | Muntz | Jan. 7, 1947 |
| 2,414,011 | Billner | Jan. 7, 1947 |
| 2,425,883 | Jackson | Aug. 19, 1947 |
| 2,477,407 | Grant | July 26, 1949 |
| 2,519,330 | Evans et al. | Aug. 15, 1950 |
| 2,558,855 | Knewstubb et al. | July 3, 1951 |
| 2,565,219 | Gardner et al. | Aug. 21, 1951 |
| 2,653,118 | Seymour | Sept. 22, 1953 |
| 2,671,158 | Rubenstein | Mar. 2, 1954 |

FOREIGN PATENTS

| 542,801 | Great Britain | Jan. 28, 1942 |
|---|---|---|

OTHER REFERENCES

Concrete, June 1949, pages 12 and 45.
Engineering News-Record, March 1, 1951, page 45.